United States Patent
Beckert et al.

(10) Patent No.: US 9,808,927 B2
(45) Date of Patent: Nov. 7, 2017

(54) VOLTAGE CONTROL AT LOW TEMPERATURE TO AVOID UNDERVOLTAGE SWITCH-OFFS IN BATTERY-POWERED, HAND-OPERATED ELECTRIC TOOLS

(71) Applicant: Hilti Aktiengesellschaft, Schaan (LI)

(72) Inventors: Benedikt Beckert, Augsburg (DE); Thomas Mueller, Klosterlechfeld (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/036,645

(22) PCT Filed: Nov. 14, 2014

(86) PCT No.: PCT/EP2014/074573
§ 371 (c)(1),
(2) Date: May 13, 2016

(87) PCT Pub. No.: WO2015/071400
PCT Pub. Date: May 21, 2015

(65) Prior Publication Data
US 2016/0279781 A1    Sep. 29, 2016

(30) Foreign Application Priority Data
Nov. 15, 2013  (EP) .................................... 13193102

(51) Int. Cl.
*B25F 5/00* (2006.01)
*H02K 7/14* (2006.01)
*H02P 7/29* (2016.01)

(52) U.S. Cl.
CPC .............. *B25F 5/00* (2013.01); *H02K 7/145* (2013.01); *H02P 7/29* (2013.01)

(58) Field of Classification Search
CPC .......... H02K 7/145; H02K 11/93; H02P 7/29; H02P 31/00; H02P 3/08; H02P 27/08
See application file for complete search history.

(56) References Cited

U.S. PATENT DOCUMENTS

| 4,256,999 A | * | 3/1981 | Richter | .............. B23Q 15/0075 318/285 |
| 5,901,176 A | * | 5/1999 | Lewison | .................. H03K 7/08 332/109 |
| 2003/0048006 A1 | * | 3/2003 | Shelter, Jr. | .............. H02J 9/061 307/64 |

FOREIGN PATENT DOCUMENTS

| DE | 10 2009 041 878 A1 | 3/2011 |
| WO | WO 2009/102082 A2 | 8/2009 |

(Continued)

OTHER PUBLICATIONS

PCT/EP2014/074573, International Search Report (PCT/ISA/220 and PCT/ISA/210) dated Jan. 27, 2015, with partial English translation, enclosing Written Opinion of the International Searching Authority (PCT/ISA/237) (Fifteen (15) pages).

*Primary Examiner* — Karen Masih
(74) *Attorney, Agent, or Firm* — Crowell & Moring LLP

(57) ABSTRACT

An electric tool is disclosed. The tool includes an electric motor, a battery, a monitoring device for monitoring a monitoring operation-value limit, where the monitoring operation-value limit lies above an operation-value limit of the battery, an adjustable resistor component, and an operation-value controller for setting at least one operation-value of the electric motor by a pulse width modulation (PWM) duty cycle. The PWM duty cycle is a first value that is derivable from a current setting of the adjustable resistor component or a second value that corresponds to a PWM duty cycle last used for setting the at least one operation-value plus an offset value. A lower of the first value or the (Continued)

second value is selected for the PWM duty cycle, if an operation-value of the battery lies above the monitoring operation-value limit.

9 Claims, 1 Drawing Sheet

(56) References Cited

FOREIGN PATENT DOCUMENTS

| WO | WO 2011/122695 A1 | 10/2011 |
| WO | WO 2012/079936 A2 | 6/2012 |

* cited by examiner

VOLTAGE CONTROL AT LOW TEMPERATURE TO AVOID UNDERVOLTAGE SWITCH-OFFS IN BATTERY-POWERED, HAND-OPERATED ELECTRIC TOOLS

This application claims the priority of International Application No. PCT/EP2014/074573, filed Nov. 14, 2014, and European Patent Document No. 13193102.4, filed Nov. 15, 2013, the disclosures of which are expressly incorporated by reference herein.

BACKGROUND AND SUMMARY OF THE INVENTION

The present invention relates to an electric tool, operated independently from the mains, which comprises an electric motor for operating the electric tool as well as a battery. In addition, the electric tool comprises a monitoring device for monitoring a monitoring operation-value limit, wherein the monitoring operation-value limit lies above an operation-value limit of the battery. Furthermore, the electric tool comprises an adjustable resistor component for varying the power output of the electric motor as well as an operation-value controller for setting at least one of the operation-values present at the electrical motor by means of pulse width modulation (PWM).

Furthermore, the present invention relates to a method for controlling an electric motor in an electric tool, operated independently from the mains, by means of a time-controlled monitoring of a monitoring operation-value limit by means of a monitoring device, wherein the monitoring operation-value limit lies above an operation-value limit of a battery.

Typically, hand-operated, battery-driven electric tools, such as drills, screwdrivers, saws, or similar, have various protection and shut-off functions, which serve to protect the individual systems within and also outside of the electric tool. These include for example the undervoltage lockout, which ensures that the respective electric tool is shut off when the supply voltage of a battery falls below a predefined limit. Turning off the electrical device serves to prevent drawing power up to almost complete depletion of the battery's capacity (risk of deep discharge), which can result in irreparable damage to the battery. Also the undervoltage lockout also serves to protect other systems, in particular the control electronics of the electric tool, from malfunctioning, damage, or destruction. The undervoltage lockout prevents the continued use of the electric tool until the battery again puts out a voltage lying at least above the supply voltage limit. Such an interruption in using an electric tool caused by the undervoltage lockout represents a substantial impairment for the user, since a shutoff due to an undervoltage is associated with a relatively long waiting period until one can continue using the electric tool.

Extreme environmental influences, particularly low temperatures, i.e., temperatures that lie well below a conventional room temperature of approx. 18° C., cause in some cases drastic output reductions in storage batteries. The reason is that in the cold, chemical processes proceed more slowly and the viscosity of the electrolytes used in Li cells increases considerably; at the same time, storage batteries and particularly lithium-ion storage batteries experience an increased internal resistance at low temperatures. However, the decrease in the providable output (voltage) of a battery results in the limit of the supply voltage being undershot even earlier when using the electric device. Particularly due to load peaks, which can occur during a temporary high output demand by the electric motor (e.g., for higher torque), the limit of the supply voltage can be quickly undershot. As a consequence of this, the undervoltage lockout intervenes in the controller of the electric motor and at least temporarily interrupts the output of the electric motor to prevent damage to the battery and the other systems. Users hereby repeatedly experience undesired interruptions when using the electric tool.

Due to the potential risk of deep discharges as well as the associated possible damage to a battery, one cannot forego continuous monitoring of the battery voltage or effective undervoltage lockout in an electric tool. On the other hand, the undervoltage lockout's continuous shutting off of the electric device, particularly at low ambient temperatures, results in inefficient working with the electric tool or prevents it entirely. In addition, the regular shutting off of the electric motor prevents the electric motor, and thus the electric device as well as the battery itself, from being able to heat themselves up, to thereby be able to avoid a temperature-caused shutoff by the undervoltage lockout.

Furthermore, there is the problem when the battery voltage suddenly increases again due to a load change on the electric motor. Such a load change can occur particularly because of a load reduction on the electric motor due to a decrease of the torque to be applied or because of an increase of the battery temperature due to intrinsic heating of the electric tool. In the case of load changes, the battery voltage increases again above the monitoring voltage limit, whereupon the controller assumes again that there is sufficient battery voltage and the PWM duty cycle of the voltage regulator for adjusting the operating voltage is derived again directly from the current position of the potentiometer. This elevated operating voltage again results directly in most cases in a drop in the battery voltage below the monitoring voltage limit and thus to a type of fluctuation behavior between the reduction of the operating voltage, or the PWM duty cycle of the voltage regulator, and the normal operating mode without such a reduction. Likewise, erratic changes of the battery voltage can cause rapid voltage drops that nevertheless result in the electric tool shutting off.

An object of the present invention consists in solving the problem described above and to this end providing a mains-independently operated electric tool as well as a method for controlling an electric motor in a mains-independently operated electric tool to ensure effective use of a battery for operating an electric tool.

The task is solved according to the invention by means of a mains-independently operated electric tool, which comprises an electric motor for operating the electric tool as well as a battery. In addition, the electric tool comprises a monitoring device for monitoring a monitoring operation-value limit, wherein the monitoring operation-value limit lies above an operation-value limit of the battery. Furthermore, the electric tool comprises an adjustable resistor component to vary the output delivered by the electric motor as well as an operation-value controller for setting at least one operation-value present at the electric motor by means of pulse width modulation (PWM).

According to the invention, a PWM duty cycle of the operation-value controller is established for setting the at least one operation-value, which corresponds to a first value or a second value, in which the first value can be derived from the current setting of the resistor component and the second value corresponds to the PWM duty cycle last used for setting the at least one operation-value plus an offset value, wherein for setting the at least one operation-value, the lower of the first or second value is selected for the PWM duty cycle if the at least one operation-value of the battery lies above the monitoring operation-value limit. One hereby prevents the at least one operation-value of a battery from dropping again rapidly below the operation-value limit of the battery, whereby a shutting off of the electric motor to protect the battery or other systems is avoided, and simultaneously one can continue using the electric tool. The operation-value may be a voltage value, for example. However, it is also possible that the operation-value pertains to the current strength or similar. Furthermore, it is also possible that the operation-value is the operating mode, i.e., the switched-on mode or the switched-off mode of the electric tool.

According to an embodiment of the present invention, the operation-value limit may be adjustable depending on a temperature value. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the operation-value limit.

Depending on the respective temperature value, the operation-value limit may be set lower or higher. It is hereby provided that for a low temperature value, the operation-value limit is set lower, wherein however it shall be noted that the operation-value limit always lies below the monitoring operation-value limit. Accordingly, the operation-value limit is set higher for a low temperature value.

According to another embodiment, the offset value may correspond to a percentage of the PWM duty cycle last used for controlling the electric motor. In particular, the percentage may correspond to a value between 2% and 20% of the PWM duty cycle last used to control the electric motor. However, it is also possible that a higher or, equally, a lower offset value, depending on a temperature value, can be used. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the operation-value limit.

To ensure regular monitoring of the voltage values of the battery, a time-controlled monitoring apparatus may be provided for the periodic monitoring of the at least one operation-value of the battery.

The time-controlled monitoring apparatus may be designed, according to an embodiment of the present invention, in such a manner that the at least one operation-value of the battery is monitored in time-based intervals. In particular, the time interval may correspond to a value between 1 ms and 100 ms. However, it is also possible that larger or smaller time intervals can be used to monitor the at least one operation-value of the battery depending on a temperature value. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the operation-value limit.

According to another advantageous design of the present invention, it is also possible that the monitoring operation-value limit is realized by a monitoring voltage limit, the operation-value limit by an undervoltage limit, the operation-value controller by a voltage regulator, and the at least one operation-value by the operating voltage. One can hereby prevent the voltage of a battery from dropping again below the operation-value limit of the battery, whereby a shutting-off of the electric motor to protect the battery or other systems can be prevented and simultaneously one can continue using the electric tool.

In addition, the task is achieved according to the invention by a method for controlling an electric motor in a mains-independently operated electric tool by a time-controlled monitoring of a monitoring operation-value limit by means of a monitoring apparatus, wherein the monitoring operation-value limit lies above an operation-value limit of a battery.

According to the invention, the method comprises setting at least one operation-value of the electric motor by specifying a PWM duty cycle of an operation-value controller to the lower value of a first value or a second one, wherein the first value can be derived from the last setting of the resistor component and the second value corresponds to the PWM duty cycle, last used to set the at least one operation-value, plus an offset value, if the at least one operation-value of the battery lies above the monitoring operation-value limit.

One hereby prevents the at least one operation-value of a battery from dropping too quickly again below the operation-value limit for the battery, whereby a shutting-off of the electric motor to protect the battery or other systems can be prevented and simultaneously one can continue using the electric tool.

In addition, according to another design of the present invention, the ability to set the operation-value limit depending on a temperature value may be provided. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the undervoltage limit.

Depending on the respective temperature value, the operation-value limit may be set lower or higher. It is hereby provided that for a low temperature value, the operation-value limit is set lower, wherein however it shall be noted that the operation-value limit always lies below the monitoring operation-value limit. Accordingly, the operation-value limit is set higher for a low temperature value.

According to another embodiment of the present invention, a setting of the offset value corresponding to a percentage of the PWM duty cycle last used to control the electric motor may be provided. In particular, the percentage may correspond to a value between 2% and 20% of the PWM duty cycle last used to control the electric motor. However, it is also possible that a higher or also lower offset value, dependent on a temperature value, can be used. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the undervoltage limit.

Furthermore, according to another design of the present invention, an adjusting of the time-based monitoring of the monitoring operation-value limit can be provided in time-based intervals. In particular, the time interval may correspond to a value between 1 ms and 100 ms. However, it is also possible that larger or smaller time intervals can be used to monitor the at least one operation-value of the battery depending on a temperature value. The temperature value may be for example the temperature of the battery or the temperature of the electric device. However, it is also possible that the temperature value corresponds to the temperature of the battery and the temperature of the electric device. This means that the temperature value can be adjusted either only to the temperature of the battery or only to the temperature of the electric device without taking into account the temperature of the battery. Furthermore, it may also be possible that the temperature value stems from a combination of the temperature of the battery as well as the temperature of the electric device. In addition, it may also be possible that for the temperature value, the ambient temperature of the battery and/or the electric device are additionally or exclusively taken into account for setting the operation-value limit.

In addition, according to an advantageous design of the present invention, it is also possible that the monitoring operation-value limit is realized by a monitoring voltage limit, the operation-value limit by an undervoltage limit, the operation-value controller by a voltage regulator, and the at least one operation-value by the operating voltage. One can hereby prevent the voltage of a battery from dropping again below the operation-value limit of the battery, whereby a shutting-off of the electric motor to protect the battery or other systems can be prevented and simultaneously one can continue using the electric tool.

Additional advantages are revealed in the following drawing description. The drawing depicts an embodiment of the present invention. The drawing, the description, and the claims comprise numerous features in combination. A person skilled in the art will appropriately consider the features also on an individual basis and bring them together in other reasonable combinations.

DETAILED DESCRIPTION OF THE DRAWING

Figure 1:
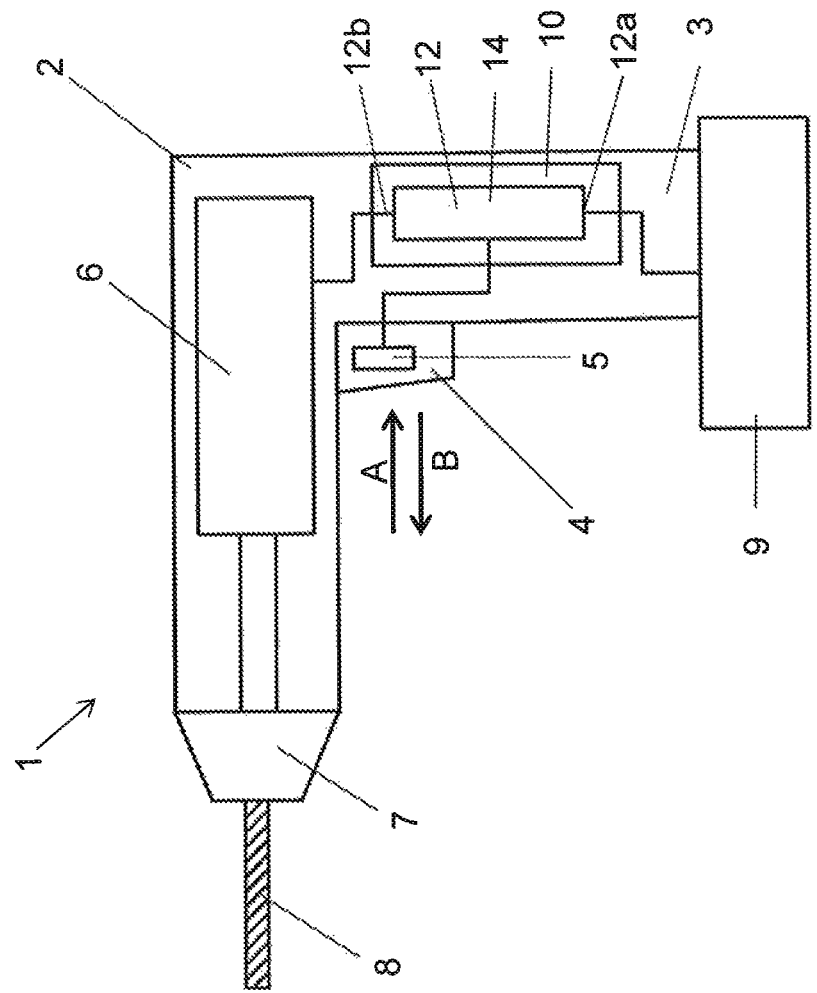
FIG. 1 depicts a schematic view of an electric tool, operated independently of the mains, according to the invention.

FIG. 1 schematically depicts an electric tool 1, which may be a drill, a drill hammer, a grinder, a saw, a plane, an angle grinder or similar. In this case, electric tool 1 is a battery-operated drill.

Electric tool 1 comprises a housing 2 with a hand grip 3. In housing 2, there is an electric motor 6, which serves to drive a tool 8, such as a drill, located in a tool receptacle 7. For example, electric motor 6 may be a direct current motor, wherein electric motor 6 is supplied with electric energy by means of an energy storage device 9 that consists of a battery and that can be recharged and plugged into hand grip 3. On handgrip 3, there is a switch 4 with a resistor component 5 designed as a potentiometer for varying the rotational speed, the torque, or similar of electric motor 6.

In housing 2, there is also a control device 10 for controlling electric motor 6. Control device 10 has a voltage regulator 12 designed as an operation-value controller, which receives, at an operation-value controller input 12a designed as a voltage regulator input, the operation-value, here in the form of battery voltage, provided by battery 9.

Voltage regulator 12 is equipped with a time-discrete monitoring device 14 for monitoring a monitoring operation-value limit designed in the form of a monitoring voltage limit to decrease the battery voltage provided by battery 9 to a changeable operating voltage for electric motor 6. Monitoring device 14 is designed as an actuation electronics system. The time-discrete monitoring occurs in regular time intervals, for example every 10 ms. However, it is also possible, depending on the application case, to specify higher or lower time intervals.

The operating voltage is connected to electric motor 6 via a voltage regulator output 12b of voltage regulator 12. The operation-value limit designed as an undervoltage limit serves as a threshold for the monitoring device 14, which when undershot turns off electric tool 1 to prevent further discharging of battery 9 and thus possible damage.

The monitoring voltage limit provided for battery 9 in turn serves to intervene in the operation of electric tool 1 in a regulating manner, when the voltage of battery 9 has decreased drastically. The regulating intervention in the operation of electric tool 1 occurs as soon as the voltage of battery 9 falls below the previously specified monitoring voltage limit. The monitoring voltage limit may thus be set as a function of the respective temperature of battery 9 and/or electric tool 1, wherein the monitoring voltage limit is set all the lower, the lower the temperature is. The intervention in the operation of electric tool 1 triggered by falling below the monitoring voltage limit occurs by decreasing the operating voltage of electric tool 1 by means of voltage regulator 12. Alternatively, any other operation-value of battery 9, any other monitoring operation-value limit, and/or any other operation-value of electric tool 1 may be used.

By voltage regulator 12 decreasing the operating voltage, a further voltage drop below the undervoltage limit of battery 9, and thus an inevitable shutting-off of electric tool 1 to avoid a further discharge of battery 9 (risk of deep discharge), is prevented.

In the present case, voltage regulator 12 is designed as a pulse width modulation regulator (PWM regulator), i.e., electric motor 4 is controlled via a so-called duty cycle. For this, voltage regulator 12 is connected to switch 4 as well as potentiometer 5.

To set the operating voltage and then to set the rotation speed, the torque or similar, switch 4 is pushed in direction A. Pushing switch 4 changes the position of potentiometer 5, whereupon a signal is sent to voltage regulator 12. The signal thereby corresponds to the respective position of potentiometer 5. The further switch 4 is pushed in direction A, the further the speed or torque of electric motor 6 increases. When the pressure on switch 4 is reduced, i.e., moved in a direction B by means of a non-depicted spring, the rpm or torque of electric motor 6 also decreases. Voltage regulator 12, designed as a PWM regulator, sends a duty cycle to electric motor 6 for controlling the rpm or the torque. The duty cycle thereby corresponds to the respective position of switch 4 and potentiometer 5, respectively.

In the event that, for example due to a low temperature, the available voltage in battery 9 falls under the monitoring voltage limit, monitoring device 14 intervenes in a regulating manner in the operation of electric device 1. To this end, the operating voltage of electric device 1 is specified by adjusting the duty cycle to the extent that the battery voltage once again lies above the monitoring voltage limit. The output of electric motor 1, i.e., its rpm or torque, is thereby reduced, yet a shut-off due to the risk of undervoltage or deep discharge is prevented by the undervoltage lockout.

When the battery voltage once again lies above the monitoring voltage limit, setting the operating voltage is derived again directly from the current position of the potentiometer. However, to prevent the battery voltage from falling back prematurely below the monitoring voltage limit due to another elevated operating voltage, the voltage regulator's PWM duty cycle used for the respective next time-slice cycle is limited for setting the operating voltage. For this limitation, either one selects a PWM duty cycle that can be derived from the current position of the potentiometer or that corresponds to the last used PWM duty cycle plus an offset value, depending on which of these two PWM duty cycles is lower.

For example, the offset value may correspond to 10% of the last used duty cycle. However, it is also possible depending on the application situation to specify a higher or lower offset value. To set the operating voltage, that duty cycle for controlling electric motor 6 is used that corresponds to the lower one of the two previously described duty cycles. In the event that the user of electric tool 1 chooses to reduce the pressure on potentiometer 5 or switch 4, and voltage regulator 12 thereby sends a corresponding duty cycle to control electric motor 6, which is lower than the last sent duty cycle plus an offset value, then this lower duty cycle (derived from the new switch position that has been pushed less far) is used to adjust the operating voltage. In the event that the last used duty cycle plus an offset value is lower than the currently or last used duty cycle (derived from the new switch position that has been pushed less far), then consequently, this duty cycle (current duty cycle plus an offset value) is used to set the operating voltage.

Through the comparison of a first and a second duty cycle as well as the use of the lower of the two duty cycles, the operating voltage of an electric device 1 can be set in such a manner that one can thereby avoid another premature undershooting of the monitoring voltage limit, and consequently a shutting-off by an undervoltage lockout, and simultaneously continue using electric device 1.

The features disclosed in the preceding description, claims, and drawings may be of significance individually as well as in any combination for realizing the invention in its various configurations.

The invention claimed is:

1. An electric tool, operated independently of the mains, comprising:
   an electric motor;
   a battery;
   a monitoring device for monitoring a monitoring operation-value limit, wherein the monitoring operation-value limit lies above an operation-value limit of the battery;
   an adjustable resistor component; and
   an operation-value controller for setting at least one operation-value of the electric motor by pulse width modulation (PWM);
   wherein a PWM duty cycle of the operation-value controller is specified to set the at least one operation-value, which corresponds to a first value or a second value, wherein the first value is derivable from a current setting of the adjustable resistor component and wherein the second value corresponds to a PWM duty cycle last used for setting the at least one operation-value plus an offset value;
   wherein for setting the at least one operation-value, a lower of the first value or the second value is selected for the PWM duty cycle, if an operation-value of the battery lies above the monitoring operation-value limit;
   and wherein the offset value corresponds to a percentage of a last used PWM duty cycle for controlling the electric motor.

2. The electric tool according to claim 1, wherein the operation-value limit of the battery is settable dependent on a temperature value.

3. The electric tool according to claim 1, wherein a time-controlled monitoring apparatus is provided for periodic monitoring of the operation-value of the battery.

4. The electric tool according to claim 3, wherein the time-controlled monitoring apparatus monitors the operation-value of the battery in time intervals.

5. The electric tool according to claim 1, wherein the monitoring operation-value limit is realized by a monitoring voltage limit, the operation-value limit by an undervoltage limit, the operation-value controller by a voltage regulator, and the at least one operation-value by an operating voltage.

6. A method for controlling an electric motor in a mains-independently operated electric tool through a time-controlled monitoring of a monitoring operation-value limit by a monitoring device, wherein the monitoring operation-value limit lies above an operation-value limit of a battery, comprising the steps of:
   setting at least one operation-value of the electric motor by specifying a pulse width modulation (PWM) duty cycle of an operation-value controller to a lower of a first value or a second value, wherein the first value is derivable from a current setting of an adjustable resistor component and the second value corresponds to a PWM duty cycle last used for setting the at least one operation-value plus an offset value, if an operation-value of the battery lies above the monitoring operation-value limit; and adjusting of the offset value corresponding to a percentage of the PWM duty cycle last used.

7. The method according to claim 6, further comprising adjusting of the operation-value limit of the battery dependent on a temperature value.

8. The method according to claim 6, further comprising adjusting of the time-controlled monitoring in time intervals.

9. The method according to claim 6, wherein the monitoring operation-value limit is realized by a monitoring voltage limit, the operation-value by an undervoltage limit, the operation-value controller by a voltage regulator, and the at least one operation-value by an operating voltage.

* * * * *